Jan. 4, 1966 E. J. BURKE 3,227,194
TERMINAL MAKING APPARATUS
Original Filed April 14, 1961 2 Sheets-Sheet 1

INVENTOR.
EARL J. BURKE
BY
Connolly and Hutz
HIS ATTORNEYS

*INVENTOR.*
EARL J. BURKE
HIS ATTORNEYS

United States Patent Office 3,227,194
Patented Jan. 4, 1966

3,227,194
TERMINAL MAKING APPARATUS
Earl J. Burke, Stamford, Vt., assignor to Sprague Electric Company, North Adams, Mass., a corporation of Massachusetts
Original application Apr. 14, 1961, Ser. No. 103,108, now Patent No. 3,168,117, dated Feb. 2, 1965. Divided and this application May 12, 1964, Ser. No. 370,753
3 Claims. (Cl. 140—102.5)

This application is a division of S.N. 103,108 filed April 14, 1961, which issued on February 2, 1965 as U.S. Letters Patent 3,168,117.

This invention relates to the making of electrical leads and, more particularly, to apparatus for making leads for electrical capacitors.

The leads for convolutely wound electrical capacitors are connected to the active electrodes of the capacitor and extend from the capacitor to permit easy attachment in electrical circuitry. Convolutely wound capacitors generally have a pair of electrodes which are of opposite polarity when in use. These electrodes are connected into electrical circuitry by lead wires which generally extend axially from the capacitors. In one form of convolute capacitor winding the foils are wound so as to be disposed with edges of one foil extending from one of the ends of the capacitor and edges of the other foil extending from the other end. The lead wires are attachable to these respective ends.

These lead wires for a convolutely wound capacitor are preferably secured to a capacitor section by some attaching means which holds the lead wire in firm connection to the capacitor section. An electrical connection may be achieved in this manner by forming the lead wire into a loop and soldering the loop to the foils extending from the end of the capacitor. Axially extending lead wires are easily mountable upon the capacitor section by soldering such looped wire ends to each of the respective foils at the respective ends of the convolutely wound capacitor section. It is important that the loop in the lead wire forms a good contact with the ends of the extended foils that is distributed over a substantial area. In the production of capacitors, it is important to provide a standard lead wire for attachment to a capacitor section so as to make the attachment of lead wires to capacitor sections an easily reproducible operation.

A firm attachment of the lead wire to the capacitor section is highly desirable. A lead wire which has been found to be particularly useful for attachment to convolutely wound capacitors has a portion formed into a radial loop with a relatively small tail portion of the wire extending in one direction from the loop and with a relatively longer section of the lead wire extending in the other direction from the loop. This looped lead wire is connected to the convolutely wound capacitor so that the tail portion extends into or through the active section of the capacitor while the radial loop contacts the extended foil ends of an electrode of the capacitor. A radial loop lead wire of this type when thus connected to a capacitor is particularly useful and has many advantages.

In the creation of the radial loop in such a lead wire, it is important that the shape of the radial loop and the relationship between the radial loop and the tail portion and the extended portion of the lead wire be accurately controlled. It is desirable to produce such radial loop lead wires in large numbers easily and rapidly with a very low percentage of produced units having improperly shaped or ill-proportioned loops. The radial loop lead wires are produced from conventional lead wire stock. This stock is a tinned copper wire which is relatively malleable, has good tensile properties, and is satisfactory for normal electrical circuitry use. The lead wire stock for the radial loop wire involved in this invention is comparable to conventional lead wire used in the electronic and electrical industry. This wire, while admirably suited for making good connections in electrical circuitry, presents problems in the rapid and easy production of a radial loop intermediate the ends of the wire section of a size suitable for capacitor ends.

It is an object of this invention to provide apparatus for permanently looping an electrical wire intermediate its ends.

It is another object of this invention to provide apparatus which is capable of accurately looping a capacitor lead wire.

It is still another object of this invention to provide apparatus for assuring the proper loop formation in a capacitor lead wire.

A still further object of this invention is to provide apparatus for wire formation resulting in a loop in a plane normal to the axis of the wire.

These and other objects of this invention will become apparent upon consideration of the following description taken together with the accompanying drawings in which.

This invention provides a length of wire having a radial loop formed at any desired position along the wire irrespective of the relation between the termination of the wire and the radial loop. The independence of the position of the loop permits the creation of a plurality of such loops along a length of wire. The loops may have one or more turns apiece. A portion of a lead wire is predisposed with double bends separated by an intermediate section so that it will go into a desired radial loop upon the simple act of bringing the bends together in a restraining tube. The wire is curled into a circular loop by an axial movement under a compressive force. Under the compressive action the ends of the wire are aligned with each other and move directly toward each other.

Figure 1:
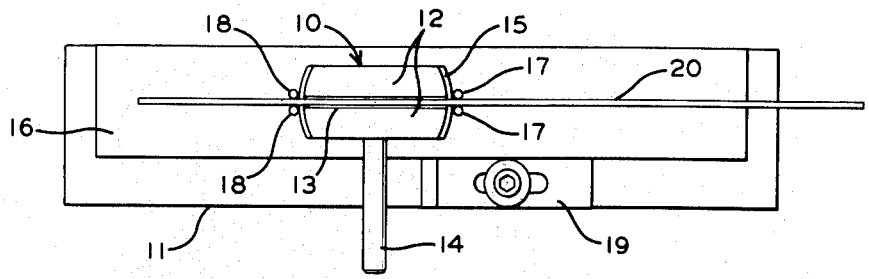
FIGURE 1 is a plan view of apparatus for pre-forming wire with an electrical wire positioned in the apparatus.

Referring to the figures, a tool 10 for predisposing the lead wire is shown mounted on a frame 11. The tool 10 is made up of a pair of parallel jaws 12 separated by a narrow slot 13 and carrying a lever 14 extending laterally from one side of the tool 10. The tool 10 has curved lateral surfaces 15 forming the ends of the jaws 12. The tool 10 is rotatably positioned on a surface 16 of the frame 11. A pair of pins 17 are mounted perpendicularly on the surface 16 immediately adjacent to, but separated from, the ends of the jaws 12 at the right side of the tool 10 as seen in FIGURE 1. Another pair of pins 18 are similarly mounted upright on the surface 16 adjacent to, but separated from, the ends of the jaws 12 at the left side of the tool 10 as seen in FIGURE 1. The pins 17 and 18 are separated from each other respectively by a space approximately the same as the width of slot 13. Thus, as shown in FIGURE 1, the pair of pins 17, the slot 13, and the pair of pins 18 are in alignment. The lever 14 extends perpendicularly to this alignment laterally across the side of the frame 11 so that, in this position, the lever 14 is spaced away from a stop 19 mounted at the side of the frame. In this position, a wire 20 positioned in the tool 10 lies relatively straight between the pairs of pins 17 and 18 and through the slot 13.

Figure 2:
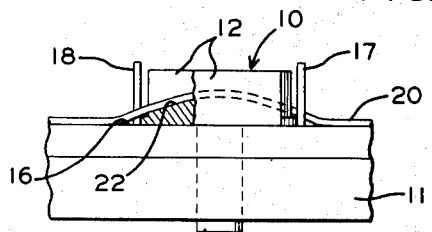
FIGURE 2 is a side elevation partly in section of a portion of the apparatus shown in FIGURE 1.

In the side elevation shown in FIGURE 2, the tool 10 is shown mounted on a spindle 21 which extends downwardly through frame 11. Pins 17 and 18 are shown adjacent to the tool 10. In FIGURE 2, the parallel jaws 12 are shown supported on the surface 16. The nearer of the jaws 12, as shown in FIGURE 2, is partly broken away to reveal the far jaw 12 at the other side of the narrow slot 13 and a portion of the curved bed 22 at the bottom of the slot 13. The remainder of the wire 20 running through the tool 10 lies on the surface 16. The diametral configuration of the bed 22 is shown by dotted lines. Thus, the wire 20 runs along the surface 16 on one side of the tool and rises and falls with the raised bed 22 within the tool 10 and then runs along the surface 16 on the other side of the tool 10.

The function of the tool 10 is the pre-formation of the wire 20 prior to the compression to form the radial loop. The tool 10 pre-forms the lead wire with a pair of double bends 23 and 24, plus a twist on its axis and a curved intermediate portion 25 between the double bends.

Figure 3:
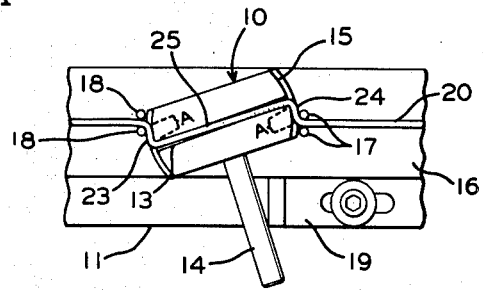
FIGURE 3 is a plan view of the central portion of the apparatus of FIGURE 1 in operation.

The double bends 23 and 24 shown in FIGURE 3 are formed by a slight rotation of the tool 10 on the axis of the spindle 21. This rotation crimps the wire 20 as the two ends of the wire lying on the surface 16 are held from rotation by the respective pairs of pins 17 and 18. As a result, the wire 20 is curved first in one direction and then the other at the two ends of the slot 13 and between the respective slot ends and their respective pairs of pins 17 and 18. As shown in FIGURE 3, the tool 10 is rotated counterclockwise and to the point where the lever 14 contacts the stop 19 to limit the rotation.

The pre-formed wire produced by the tool 10 by rotation on the frame 11 is shown in FIGURES 2 and 3. This is an intermediate product of the process of this invention. It has the two double bends 23 and 24 and the intermediate section 25 lying between these double bends 23 and 24. The intermediate portion is curved in a plane normal to the plane of the curves. This curve is formed by the contour of the bed 22. The wire 20 thus preformed is predisposed to the formation of the radial loop in the next operation.

Figure 4:
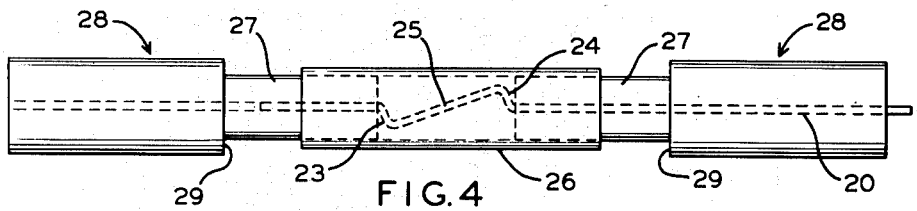
FIGURE 4 is a side view of a part of the apparatus of this invention with interior features indicated in dotted lines.

FIGURE 4 shows a restraining tube 26 receiving a pair of slidably fitted plungers 27. The plungers 27 are each reduced portions of respective compressing implements 28. The compressing implements 28 engage the pre-formed wire 20 by receiving the straight portions of the wire in axial passages which extend through the implements 28. A shoulder 29, formed on each implement 28 at the end of the plunger 27, provides an abutment against which the restraining tube 26 is seated at one end only.

As seen in FIGURE 4, the pre-formed piece of wire 20 is positioned in the compressing tool shown in FIGURE 4 by placing the axial bores of the compressive implements 28 over the respective ends of the wire 20. This assembly may take place by first placing the long straight section of the wire 20 in the right-hand implement 28 as seen in FIGURE 4. With the wire 20 thus in place, the restraining sleeve 26 is passed over the free end of the wire 20 and slid onto the plunger 27 of the right-hand implement 28. Then the left-hand implement 28, as seen in FIGURE 4, is placed over the other section of the wire 20 and the three parts of the tool are brought to the arrangement shown in FIGURE 4. In this arrangement, each plunger 27 bears against one of the double bends 23 or 24 in the wire 20. As shown in FIGURE 4, the right-side plunger 27 bears against the double bend 24 while the left-side plunger 27 engages the double bend 23. Referring again to FIGURE 2, it is seen that the curvature of the intermediate portion 25 lies in a plane normal to the double bends 23 and 24 and is not shown by the view of FIGURE 4.

As the two plungers 27 are freely slidable into the restraining tube 26, the bends 23 and 24 are readily brought together by compressive pressures exerted on the respective compressing implements 28. It is preferable that these diametric opposed pressures be relatively uniform and move the implements 28 toward each other fairly quickly. However, a considerable latitude is permitted in the compression of the double bends 23 and 24.

Figure 5:
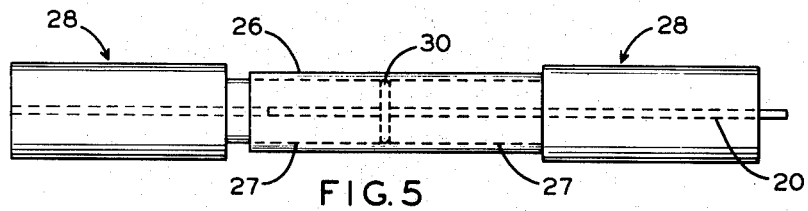
FIGURE 5 is a side view of the apparatus of FIGURE 4 after operation.

The completion of the compression step is illustrated in FIGURE 5. The two plungers 27 have been brought together, as shown by the dotted lines in FIGURE 5. The wire 20 is formed by this bringing together of the plungers and the double bends 23 and 24 have moved together to provide an intermediate loop 30 lying generally in a plane normal to general axis of wire 20. It is to be noted that the wire 20 turns axially during the compression operation. It is advantageous to mount the wire 20 so that it can rotate on itself during the compression step. The compression tool shown in FIGURES 4 and 5 does not grip the wire 20 against twisting during the compression step. The pre-forming or predisposition of the wire in the first operation step forms the double bend 23 in the opposite direction from the double bend 24 to permit the wire to rotate during the compression step.

Figure 7:
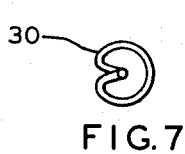
FIGURE 7 is a plan view of the end of the lead wire taken along lines 7—7 of FIGURE 6 in the direction of the arrows.
Figure 6:
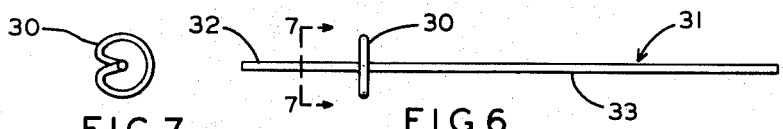
FIGURE 6 is a horizontal elevation of a looped lead wire according to this invention.

In FIGURE 6, an elevation of the product shows a lead wire 31 having the intermediate radial loop 30 between a tail 32 and an external section 33. The tail 32 and the external section 33 are integrated only through the loop 30. In FIGURE 7, the relative axial disposition of the tail 32 and the external section 33 with respect to the radial loop 30 is illustrated. The curlicue nature of the loop 30 places the tail 32 and the external section 33 in general axial alignment. The loop is essentially perpendicular to the alignment of the tail 32 and the external section 33. Similarly, as shown in FIGURE 6, the extending tail 32 and external section 33 extend from the plane of the radial loop 30. As shown in FIGURE 7, this point of axial departure is central of the loop.

The double bends 23 and 24 are each made up of sharp curves in the wire 20. The two sharp curves making up each of the double bends 23 and 24 are spaced apart by a spacing A, as shown in FIGURE 3. It is a feature of this invention that this spacing A of each of the double bends is approximately the radius of the loop that is formed in the wire at the double bends and also approximately the radius of the restraining tube. In FIGURE 7 the two spacings A on the formed radial loop 30 are shown. Thus, it is seen that in the formation of the loop 30 the two sections of the wire 20, which form the spacings A, are both close to each other.

Figure 9:
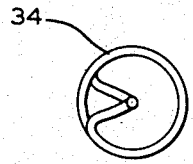
FIGURE 9 is a plan view of the end of the lead wire of FIGURE 8 taken along the lines 9—9 of FIGURE 8 in the direction of the arrows.
Figure 11:
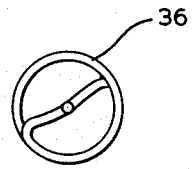
FIGURE 11 is a plan view of the end of a lead wire according to a further modification of this invention.

The number of turns making up the loop is a product of the length of the intermediate section 25 between the double bends and the relationship of the length of this intermediate section 25 to the spacings A in the pre-disposed wire after the first stage of loop formation. The FIGURES 7, 9 and 11 illustrate variations in the loop portion of the similarly formed wire as produced according to this invention.

The wire lead 31 of the preferred embodiment is formed with only one turn in the radial loop 30. It will be understood that, as explained above, by arrangement between the intermediate section 25 and the diameter of the restraining tube 26, the number of turns in the radial loop wire can be varied. In other words, a lead wire having a plurality of radial loops may be formed simply by spacing the double bends in the wire further apart. The number of turns can be increased also by decreasing the diameter of the restraining tube and the distance between the apices of the double bends.

Figure 8:
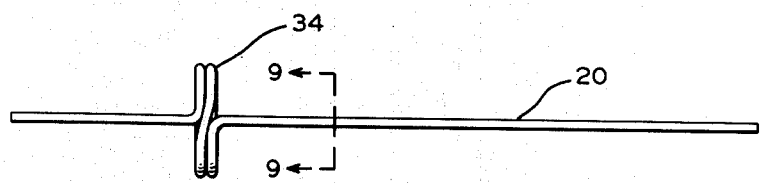
FIGURE 8 is a horizontal elevation of a looped lead wire according to a modification of this invention.

In FIGURE 8 the wire 20 of this invention is shown formed with a loop 34 made up of two turns. FIGURE 9 shows the end view of the loop 34. This loop 34 with its plurality of turns is produced by increasing the length of the section intermediate the double bends while maintaining the spacing in each of the double bends of pre-disposed intermediate product.

Figure 10:
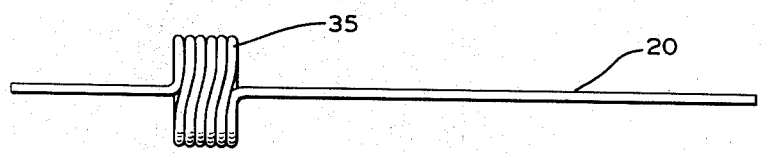
FIGURE 10 is a horizontal elevation of a looped lead wire according to another modification of this invention.

In FIGURE 10 a further modification is shown made up of an indeterminate plurality of turns in a radial loop 35 in the wire 20 of this invention. This illustrates the fact that with proper selection of make up for the wire 20 the radial loop can be formed with a large number of turns by employing the above-noted factors.

In FIGURE 11 the end view of the radial loop 36 made up of a plurality of turns shows a different arrangement of the radially extending sections of the wire 20 which correspond to the spacings A of the pre-disposed intermediate product. It is seen that these sections which are approximately the same as the radius of the loop and related to the radius of the restraining tube do not change regardless of the numbers of turns making up the radial loop. Thus, the radial loops 30, 34 and 36, all having been produced in the same restraining tube, have the same diameter, the same radius, the same radial sections of wire 20 which correspond to the spacings A in the pre-disposed intermediate product. In loops 30 and 34 the double bends of the intermediate product have been brought close together. In loop 36 the double bends are diametrically positioned. This difference is due to the difference in length of the intermediate section between the double bends. This is an illustration of the fact that the radial sections of the wire 20 in the finished product remain the same irrespective of the length of the intermediate section and also shows that the radius or diameter of the radial loop is controlled by the spacing A of the double bend.

Figure 12:
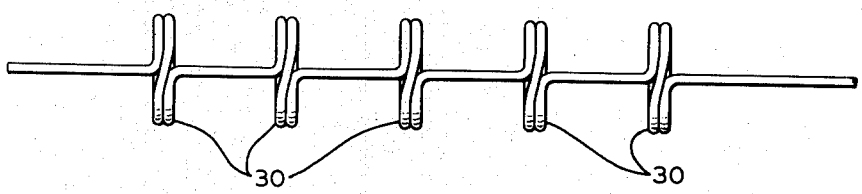
FIGURE 12 is a horizontal elevation of a looped lead wire according to a still further modification of this invention.

FIGURE 12 shows the wire 20 in a single piece made up with 5 radial loops 30 disposed and separated along its length. This illustrates the independence of the position of the radial loop formed according to this invention along the wire 20. The wire 20 can be predisposed at any point regardless of its length or the distance of the predisposition from the termination of the wire. An unlimited number of radial loops may be formed without severing the wire. It will be understood that this formation of a plurality of radial loops separately along the wire 20 can form each individual radial loop with one or more turns so that the radial loop 34 of FIGURE 8 can be formed in the multiple loop embodiment of FIGURE 12.

In the preferred embodiment 31 of FIGURES 6 and 7 the wire 20 has been cut to provide the relatively short tail portion extending in one direction from the radial loop 30 and the relatively long external section 33 extending in the other direction from the radial loop 30. It will be understood that after the formation of the respective radial loops, the wire 20 can be cut in any of a number of ways to provide modifications of the position of the radial loop on the wire 20. For example, in FIGURES 8 and 10, the wire 20 can be cut right at the turns of the respective radial loops 34 and 35 to provide curled wire end caps with no tail portion. The further application of this invention is in feed-through capacitors. The radial loop 30 formed in the wire 20 with a relatively long straight portion extending from one side and a relatively short tail portion extending from the other can be used in a construction where the relatively long portion is inserted through the center of a capacitor section to extend out the other side. At the same time the radial loop is brought into contact with extending foils of the capacitor section. The short tail section is present as the terminal lead on the radial loop side of the section.

A variety of modifications from the preferred embodiment have been shown as possible in the above description and it is noted that a 5-loop turn has been found practical by this method. Further, the hump-shaped curve of the intermediate section 25 should be limited in height to no more than the radius of the restraining tube. When so restricted, the radial loop formed from the predisposed portion of the wire 20 is nicely round or cylindrical.

The method and means of forming a radial loop in a lead wire as described herein is thus advantageous in bringing about a reliable production of lead wires containing radial loops. Additional advantages of this invention are found in the tolerance this invention has for slight irregularities in the initial wire stock from which the lead wires are formed. The wire need not be straight for the preformation step and can be used just as it comes off the roll of wire. Further, by predisposing the wire to take the desired curls, the wire is prepared for the radial loop when subjected to a simple axial compressive force and movement. These and other advantages too numerous to conveniently mention here make this means and method highly useful in the preparation of lead wires.

As indicated above, many apparently different embodiments of this invention may be made without departing from the spirit of the invention. Therefore, it is intended that the invention be limited only by the scope of the appended claims.

What is claimed is:

1. In lead-forming equipment for forming a circular loop in an electrical lead, rotatable means for bending a section of electrical wire, a narrow slot on said rotatable means, a base on which said means is rotatably mounted, two pairs of pins mounted on said base and so positioned that each is adjacent to one end of the slot in a position of alignment with said rotatable jaws, a spacing in each pair of pins comparable to the width of said slot so constructed and arranged that in said position of alignment a wire is receivable between the pins and in the slot, and means for rotating said jaws with respect to said pins so that the wire lying within said jaws and between the pins of said respective pairs of pins is crimpable, and means for subsequently axially moving together a pair of crimps formed in said wire, said crimps being removed into a common radial plane while restricting the outer circumference of the resultant circular formation to produce straight portions of the wire with the formation lying intermediate the straight portions.

2. A tool for forming a radial loop in a lead wire comprising a hollow tube, a pair of identical cylindrical members cooperable with said tube, each cylindrical member having a portion of reduced diameter fitting into the bore of the hollow tube and a portion of greater diameter, a shoulder formed between each said reduced portion and the respective greater diameter portion, a central axial bore in each cooperating tool so that portions of a predisposed wire are fittable into the respective axial bores and said reduced diameter portions are abuttable against bends in said predisposed wire section when contained within said hollow tube.

3. A terminal lead wire forming machine comprising a pair of jaws fixed with respect to each other and rotatably mounted on a frame, a narrow slot formed by a spacing between said jaws, a bed in said slot between said jaws having a curved contour formed by a raised center and sloping sides, means fixed on said frame and positioned adjacent said rotatable jaws, said fixed means being so constructed and arranged as to receive and hold an electrical wire positioned in said narrow slot in one position of said jaws and means for rotating said rotatable jaws with respect to said means, whereby a pair of crimps is formed in said electrical wire and an intermediate portion curved in a plane normal to said crimps is formed between said crimps.

References Cited by the Examiner

FOREIGN PATENTS 811,593  1/1937  France.

CHARLES W. LANHAM, *Primary Examiner.*